United States Patent
Malchow et al.

[11] Patent Number: 6,145,199
[45] Date of Patent: Nov. 14, 2000

[54] METHOD OF MANUFACTURING A BEARING MOUNTING STRUCTURE WITH REDUCED DIMENSIONAL REQUIREMENTS

[75] Inventors: Gregory L. Malchow, Oshkosh; Steve B. Schwartzkopf, Ripon, both of Wis.

[73] Assignee: Amana Company, L.P., Amana, Iowa

[21] Appl. No.: 09/339,412

[22] Filed: Jun. 24, 1999

Related U.S. Application Data

[62] Division of application No. 08/861,144, May 21, 1997, Pat. No. 5,931,585.

[51] Int. Cl.[7] .............................. B21D 53/10; B23P 17/00
[52] U.S. Cl. ..................... 29/898.07; 29/557; 384/535; 384/539
[58] Field of Search .......................... 29/898, 898.07, 29/557, 558; 72/334, 335; 384/539, 535, 441, 581, 537

[56] References Cited

U.S. PATENT DOCUMENTS

| | | | |
|---|---|---|---|
| 647,809 | 4/1900 | Davenport | 29/557 |
| 1,048,046 | 12/1912 | Currey | 72/334 |
| 1,066,276 | 7/1913 | Hockensmith | 29/898.07 |
| 2,135,418 | 11/1938 | Tinnerman | 72/335 |
| 2,308,471 | 1/1943 | Schwartz | 72/335 |
| 2,812,987 | 11/1957 | Eilmann . | |
| 3,504,903 | 4/1970 | Irwin | 29/898 |
| 3,844,010 | 10/1974 | Frost et al. | 29/898.07 |
| 4,094,559 | 6/1978 | Slusarski | 384/498 |
| 4,314,472 | 2/1982 | Saegusa et al. | 29/898.07 |
| 4,639,997 | 2/1987 | Brull | 29/407.01 |
| 4,645,361 | 2/1987 | Lakin | 384/441 |
| 4,688,952 | 8/1987 | Setele | 384/537 |
| 4,793,459 | 12/1988 | Forknall et al. . | |
| 4,908,924 | 3/1990 | Tsuruta et al. | 29/888 |
| 5,237,849 | 8/1993 | Miyazawa | 72/335 |
| 5,290,374 | 3/1994 | Holtz et al. | 29/898 |
| 5,752,318 | 5/1998 | Fannar | 29/557 |
| 5,927,137 | 7/1999 | Sinteff | 72/335 |
| 5,946,962 | 9/1999 | Fukuda et al. | 72/335 |

*Primary Examiner*—David P. Bryant
*Assistant Examiner*—Marc W. Butler
*Attorney, Agent, or Firm*—Bracewell & Patterson, L.L.P.; Ben D. Tobor

[57] ABSTRACT

A bearing system for mounting a rotating shaft includes a bearing assembly and a bearing mounting structure. The bearing assembly has an inner race which contacts the rotating shaft, an outer race, and bearing elements positioned therebetween. The outer race has an exterior surface with an outer dimension. The bearing mounting structure has a region for affixing it to an external structure in which the bearing system is to function. An internal surface of the bearing mounting structure defines a bearing cavity in which the bearing assembly is to be disposed. The internal surface engages the exterior surface of the outer race. The retention force exerted by the internal surface on the outer surface is determined by the design of the inner surface of the bearing mounting structure that defines the bearing cavity. The internal surface has cut-outs, or scallops, extending axially (with respect to the shaft) along the internal surface. Furthermore, the internal surface is slightly pre-angled inwardly toward the shaft prior to the installation of the bearing assembly. As the installation of the bearing assembly occurs, the internal surface flexes outwardly as the spring action due to the pre-angle provides the requisite retention force. The amount of retention force for a given material with a known thickness depends on the geometry of the cut-outs on the internal surface and the pre-angle. Because the retention force associated with the spring action is a function of known variables, a bearing mounting structure can be designed for a specific retention force by selecting the variables to produce the retention force.

6 Claims, 4 Drawing Sheets

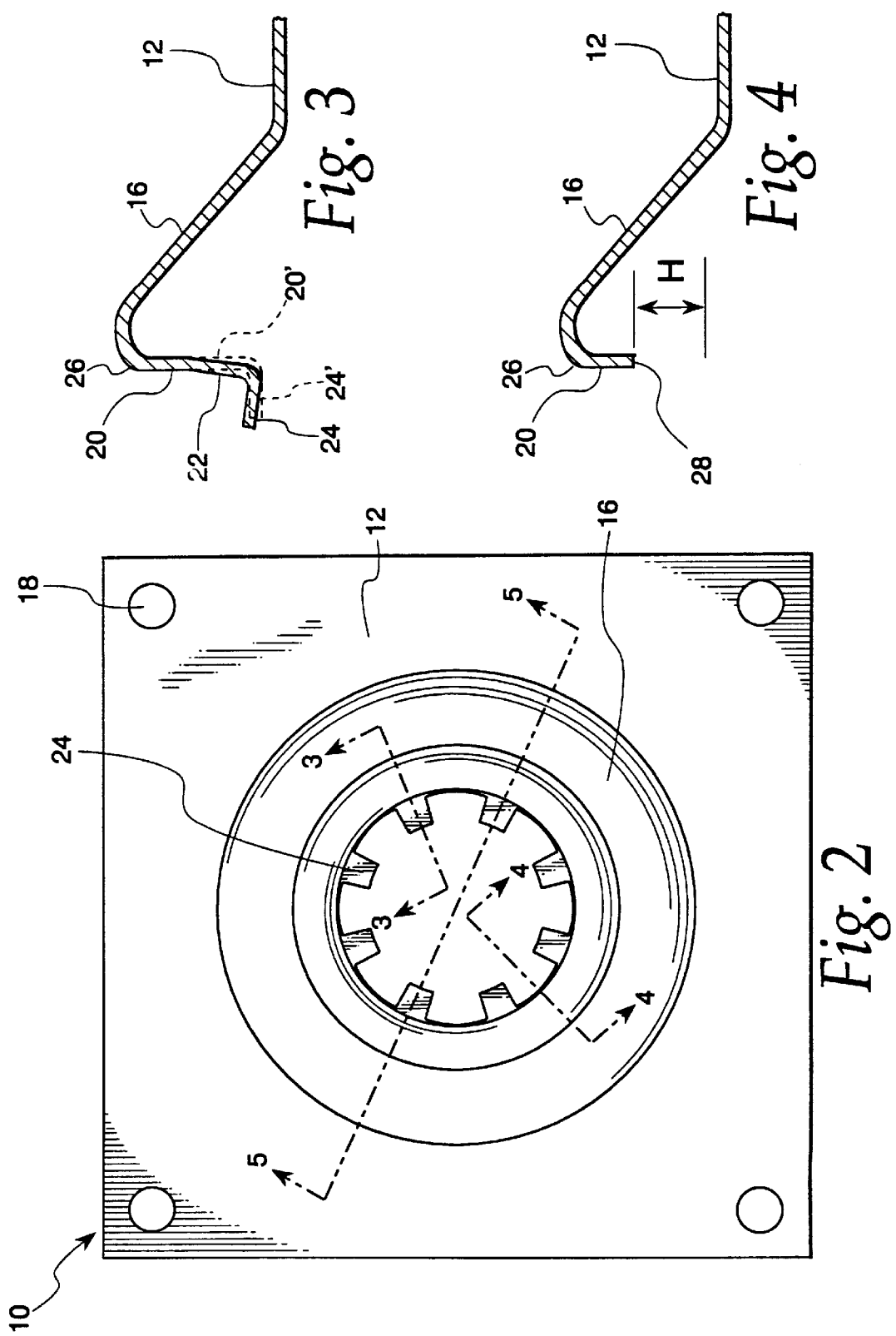

METHOD OF MANUFACTURING A BEARING MOUNTING STRUCTURE WITH REDUCED DIMENSIONAL REQUIREMENTS

This is a division of application Ser. No. 08/861,144, filed May 21, 1997 now U.S. Pat. No. 5,931,585.

FIELD OF THE INVENTION

This invention relates generally to a bearing system for mounting a rotating shaft. More particularly, the present invention relates to a bearing mounting structure which retains a bearing assembly that contains bearing elements.

BACKGROUND OF THE INVENTION

Rolling-element bearing systems have been used in the engineering world for many years. In their basic configuration, such bearing systems are characterized by an outer ring and an inner ring with the rolling elements positioned therebetween. These rings are often called races in that both the outer and inner rings have "raceways" in which the rolling elements move. A retainer ring placed between individual rolling elements to maintain the proper spacing between them may also be included. The rolling elements can be one of many types including ball, roller, tapered roller, spherical roller, etc.

As a general rule, bearing systems are sold in assemblies. These assemblies include the races, the retainer ring and the rolling elements arranged in a pre-assembled fashion. Once the design requirements of the rotating shaft are understood (i.e. the radial force, the axial force, the RPM, service life, etc.), the type of bearing element can be chosen. Once the bearing element is determined, the type and size of the assembly is known. The last aspect of the design process is to design the mounting structure in which the bearing assembly will be retained. It is this last aspect of the design process where the present invention is particularly useful.

Retaining the bearing assembly in the bearing mounting structure requires a retention force in a predetermined range. If the retention force is too small, the bearing assembly may slip or become completely dislodged within the bearing mounting structure. Alternatively, if the retention force is too large, then the bearing elements will gall the raceways ultimately leading to premature failure. Because of these potential failure modes, all components of the bearing assembly must be manufactured with extremely tight tolerances. Furthermore, the bearing mounting structure must provide for a cavity with a tight tolerance in its diametric dimension to properly accommodate the bearing assembly.

For example, in a machine running at 700 RPM with 50 pound-force (lbf) of radial force and 200 lbf of axial force, a ball-type of bearing element can be used which dictates a bearing assembly having a 2.4406 inch diameter on the exterior surface of the outer race with a +0.0003 and −0.0002 inch tolerance. The internal cavity of the bearing mounting structure in which the bearing assembly resides has a diameter of 2.440 inch with a tolerance of +0.000 inch and −0.001 inch. The diameter of the internal cavity must be within 0.001 inch (one mil) for the bearing assembly to be properly installed. If each bearing mounting structure is machined, then achieving this level of tolerance is feasible. However, machining to these tight tolerances is extremely expensive. When the bearing mounting structures are mass produced, other low-cost processes such as stamping or drawing are used to reduce cost. Since these low-cost processes are not amenable to controlling tight tolerances, many finished products are out of tolerance and discarded as waste or scrap.

One resolution to this problem has been the utilization of tolerance rings. A tolerance ring is a shim-like device which is placed into the cavity of a bearing mounting structure to assist in achieving the proper retention force. However, this additional part adds cost to the bearing system. Moreover, the labor and processes needed to install such a ring also increase the cost of the final product.

Therefore, a need exists for a bearing mounting structure that allows the tolerances to be loosened when using typical low-cost, metal-forming processes such as stamping or drawing.

SUMMARY OF THE INVENTION

A bearing system for mounting a rotating shaft includes a bearing assembly and a bearing mounting structure. The bearing assembly has an inner race which contacts the rotating shaft, an outer race, and bearing elements positioned therebetween. The outer race has an exterior surface with an outer dimension.

The bearing mounting structure has a region for affixing it to an external structure in which the bearing system is to function. An internal surface of the bearing mounting structure defines a bearing cavity in which the bearing assembly is to be disposed. The internal surface engages the exterior surface of the outer race.

The retention force exerted by the bearing mounting structure on the outer surface of the bearing assembly is determined by the design of the internal surface of the bearing mounting structure that defines the bearing cavity. The internal surface has cut-outs, or scallops, extending axially (with respect to the shaft) along the internal surface. Furthermore, the internal surface is slightly pre-angled inwardly toward the shaft prior to the installation of the bearing assembly. As the installation of the bearing assembly occurs, the internal surface flexes outwardly as the spring action associated with the designed pre-angle in the internal surface provides the requisite retention force. The amount of retention force for a given material with a known thickness also depends on the geometry of the cut-outs on the internal surface. Because the retention force associated with the spring action is primarily a function of the cut-out geometry and the pre-angle, a bearing mounting structure can be designed for a specific retention force by selecting these design criteria to produce the desired retention force. Consequently, the bearing assembly is held in place with the appropriate retention force.

Due to the pre-angle of the internal surface, the manufacturing tolerance in the bearing cavity of the bearing mounting structure is greater. Therefore, low-cost, metal-forming processes such as stamping or drawing can be employed to mass produce the bearing mounting structures without the risk of wasting numerous components because they are out of tolerance. Although the benefits achieved by the present invention can be realized in any type of machine, the bearing system will be described in the context of a household appliance such as a washer or a dryer.

BRIEF DESCRIPTION OF THE DRAWINGS

Other objects and advantages of the invention will become apparent upon reading the following detailed description and upon reference to the drawings in which:

FIG. 2 is a top plan view of the bearing mounting structure;

FIG. 3 is a cross-sectional view of the bearing mounting structure through one of the projecting structures on the internal surface of the bearing mounting structure;

FIG. 4 is a cross-sectional view of the bearing mounting structure through one of the scallops between two adjacent projecting structures on the internal surface of the bearing mounting structure;

Figure 1:
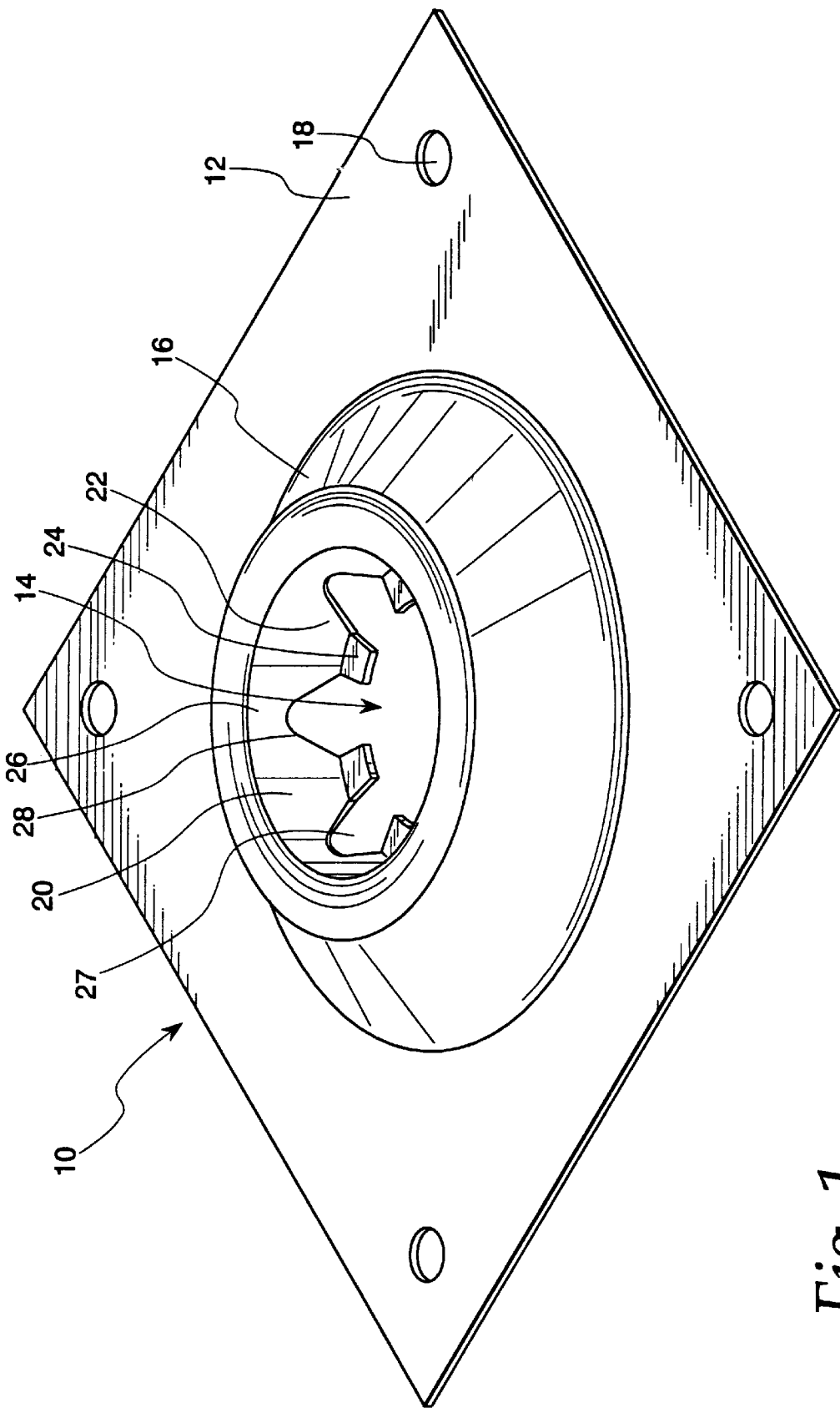
FIG. 1 is an isometric view of a bearing mounting structure incorporating the present invention.

While the invention is susceptible to various modifications and alternative forms, a specific embodiment thereof has been shown by way of example in the drawings and will herein be described in detail. It should be understood, however, that it is not intended to limit the invention to the particular forms disclosed. On the contrary, the intention is to cover all modifications, equivalents, and alternatives falling within the spirit and scope of the invention as defined by the appended claims.

DETAILED DESCRIPTION OF THE INVENTION

Referring initially to FIG. 1, a bearing mounting structure 10 includes a mounting region 12, a bearing cavity 14, and an intermediate structure 16 positioned therebetween. The mounting region 12 typically includes multiple holes 18 which allow the bearing mounting structure 10 to be affixed around a rotatable shaft in a machine requiring the use of the bearing. The mounting region 12 can be one of many shapes with the shape being dependent on the spatial requirements of the machine in which it is installed.

Figure 7:
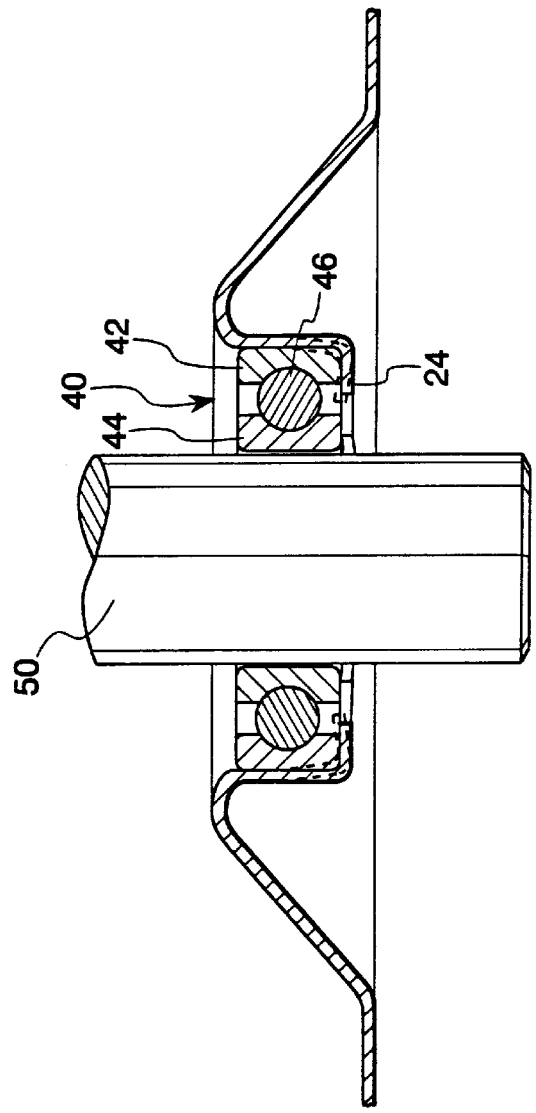
FIG. 7 is a cross-sectional view of the bearing device in FIG. 6 with a shaft engaged by the bearing assembly.
Figure 6:
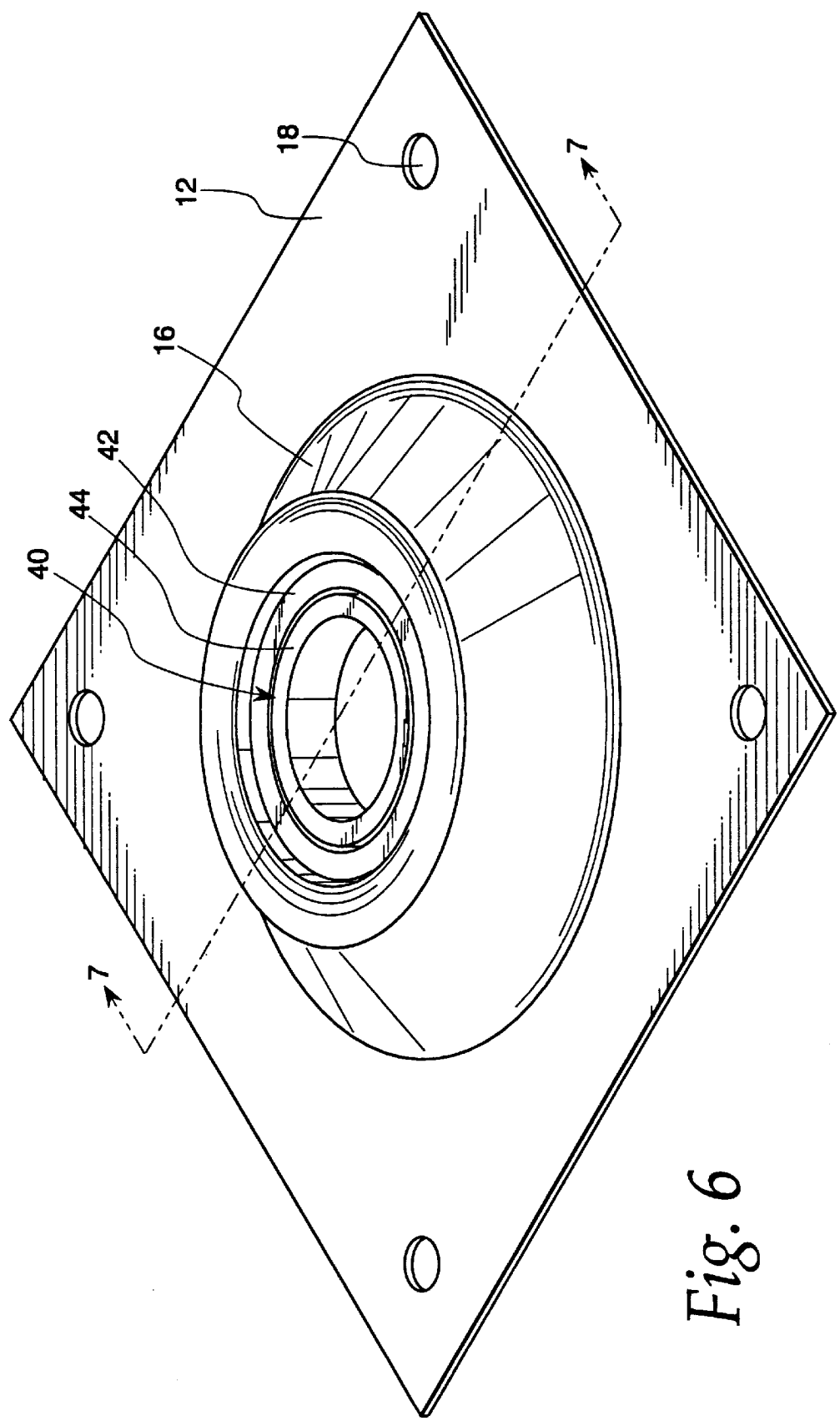
FIG. 6 is an isometric view of a bearing device including a bearing assembly positioned in the cavity of the bearing mounting structure.

As shown, the intermediate structure 16 angles upwardly from the mounting region 12 where it is connected to an internal surface 20 which defines the bearing cavity 14. The internal surface 20 includes a plurality of lower portions 22 and an upper portion 26. The internal surface 20 is slightly conical prior to the installation of the bearing assembly (FIGS. 6–7). The lower portions 22 of the internal surface 20 adjacent to radial flanges 24 define a locus having a smaller diameter than the locus defined by the upper portion 26 of the internal surface 20. The radial flanges 24 limit the movement of the bearing assembly in the axial direction thereby decreasing the amount of radial retention force that is required to retain the bearing assembly in the bearing cavity 14.

The lower portions 22 are separated by cut-outs, or scallops 27, which extend along the length of the internal surface 20 in a direction parallel with the axis of the shaft. Although the scallops 27 are shown as being defined by curvilinear edges 28 on the internal surface 20, the scallops 27 can be a variety of shapes. Due to the contour of the edges 28, the lower portions 22 are generally trapezoidal in shape as shown in FIG. 1. In one preferred embodiment, there are no sharp corners along the edges 28 which would result in stress concentrations.

FIG. 2. shows the bearing mounting structure 10 from a top plan view. The number of radial flanges 24 is seven, although this may change depending on the application. Generally, the number of radial flanges 24 (and therefore the scallops 27) is about the same as the number of bearing elements within the bearing assembly. In a preferred embodiment, the number of bearing elements is one more or one less than the number of radial flanges 24 because this configuration reduces the amount of vibration and noise in the system.

FIG. 3 is a cross-section of the bearing mounting structure 10 through one of the radial flanges 24 in the internal surface 20. To illustrate the flexibility of the internal surface 20, the cross-section shows a configuration in solid lines indicating the shape of the internal surface 20 and radial flange 24 prior to installation of the bearing assembly (i.e. a pre-angled configuration). Also shown is the shape of the internal surface 20' and the flange 24' after installation of the bearing assembly in dashed lines (i.e. a near cylindrical configuration). The angular deflection is more pronounced at the lower portion 22 than at the upper portion 26. It is this pre-angle and, more specifically, the resultant spring force derived therefrom, that retains the bearing assembly.

In FIG. 4, a cross-section is taken through one of the scallops 27. The scallops 27 extend axially (with respect to the axis of the shaft) along the internal surface 20 for a height H which is the distance between the uppermost segment of edge 28 and the radial flange 24 (FIG. 3). As such, a circumferential line through the uppermost segment of each edge 28 would represent the boundary between the upper portion 26 of the internal surface 20 and the lower portions 22 of the internal surface 20 (FIG. 3).

In addition to the amount of pre-angle in the internal surface 20, the geometry of the scallops 27 is also a primary factor that dictates the retention force of the bearing mounting structure 10. For example, because the lower portions 22 project downwardly (as shown in the figures) the height H, the lower portions 22 pivot about the uppermost segment of edge 28 (FIG. 4) defining the scallops 27. Thus, the height H is a factor in dictating the amount of retention force that the internal surface 20 exerts on the bearing assembly since the rigidity of the bearing mounting structure 10 is dependent on the height H. In a preferred embodiment, the height H is usually over half the overall axial length (with respect to the shaft) of the internal surface 20.

Figure 5:
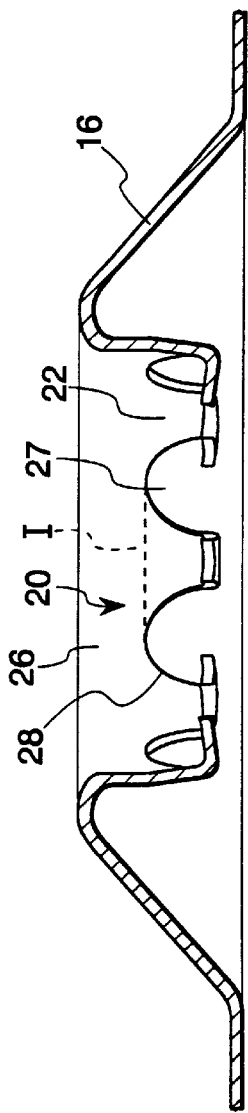
FIG. 5 is a cross-sectional view through the bearing mounting structure.

The retention force is also dependent on the circumferential length of the imaginary line I defined between the uppermost segments of the edges 28 of adjacent scallops 27 as is shown in FIG. 5. As illustrated in FIG. 5, the uppermost segment of each edge 28 is at the mid-point of the respective scallop 27. It is this imaginary line I around which the lower portions 22 of the internal surface 20 pivots as stated in the previous paragraphs. Thus, the length of the imaginary line I also dictates the rigidity and, therefore, the retention force of the internal surface 20. For example, if the length of the imaginary line I were shorter than what is shown in FIG. 5, then the bearing mounting structure 10 would provide less retention force since it would be less rigid.

Although the geometry of the scallops 27 and the magnitude of the pre-angle are the primary factors that determine the retention force in the interference fit between the bearing assembly within the bearing mounting structure 10, other factors exist as well. For example, the thickness of the material determines its rigidity as does the modulus of elasticity of the material.

The present invention is useful for mounting the shaft which drives the belt coupled to a drum in a household dryer or commercial tumbler. It is also for useful for mounting the transmission input shaft in a household washer. The dimensions of a bearing mounting structure which could be used in one of these appliances operating at 700 RPM with 50 lbf of radial force and 200 lbf of axial force will now be described. When a draw-quality steel is used having a thickness of 0.070 inch, the height H of the scallops 27 is approximately 0.40 inch to 0.50 inch. The width of the scallops 27 near the radial flange 24 is about 0.5 inch to about 0.6 inch and the radius of curvature at the top of the scallops 27 is about 0.2 inch. Generally, the diameter of the bearing cavity 14 is about 2.4 inches with the upper portion 26 having a diameter that is about 0.002 inch to about 0.020 inch larger than the diameter of the lower portion 22 to provide for the slight pre-angle (i.e. a slightly conical shape). Instead of the +0.000 and −0.001 inch diametric tolerance of the prior art bearing mounting structures, the diametric tolerance of the internal surface 20 of the bearing cavity 14 adjacent the radial flanges 24 is typically about +0.000 inch and −0.005 inch. This looser tolerance permits the use of several cost-effective, metal-forming processes to manufacture the bearing mounting structure 10 while lowering the risk of parts being out of tolerance.

Because the radial flanges 24 limit the axial movement of the bearing assembly, only approximately 10 lbf of radial force is needed to retain the bearing assembly is needed in the design. If the radial flanges 24 were not incorporated into the design, approximately 200 lbf of radial force would be needed.

FIG. 6 illustrates the bearing mounting structure 10 with a bearing assembly 40 mounted therein. The bearing assembly 40 includes an outer race 42 which engages the internal surface 20 of the bearing mounting structure 10 and an inner race 44 for engaging the shaft which is shown in FIG. 7.

FIG. 7 shows a cross-sectional view through the bearing mounting structure 10 in FIG. 6 with a shaft placed therethrough. The dashed lines represent the position of the inner surface 20 and the radial flanges 24 before installation of the bearing assembly 40. The bearing assembly 40 includes the bearing elements 46 which facilitate the rotation of shaft 50. The shaft 50 engages the inner race 44 which rotates with the shaft 50 as the outer race 42 remains stationary. The radial flange 24 does not extend far enough radially to engage the inner race 44. The outer race 42, however, engages the radial flange 24.

To produce a bearing mounting structure 10 of the type shown in the figures, the following process is utilized. A flat piece of sheet metal is formed through a drawing process to produce a cup-like feature having a height and a diameter. At the base of the cup-like feature, a perforation process is used to shape the central circular cut-out of the bearing cavity 14 and the scallops 27. A piercing process then removes the material that has been perforated. A drawing process in a direction opposite the first drawing process is then performed to create internal surface 20 of the bearing cavity 14. The radial flanges 24 are then formed to produce nearly a perpendicular angle with the internal surface 20. A final forming process is then used to produce the desired pre-angle in the lower portions 22 of the internal surface 20.

Each of these embodiments and obvious variations thereof is contemplated as falling within the spirit and scope of the invention, which is set forth in the following claims.

What is claimed is:

1. A method of manufacturing a bearing mounting structure for retaining a bearing assembly containing bearing elements, the method comprising the steps of:

providing a piece of sheet metal;

forming said piece of sheet metal into a cup-like configuration having a base;

shaping an opening in the base of the cup-like configuration, the opening having an inner circular portion and a plurality of scallops projecting radially outward from the inner circular portion;

forming a segment of the piece of sheet metal adjacent to the plurality of scallops into a tubular structure having a flexible internal surface, the internal surface having a pre-angle whereby the tubular structure has a slightly conical shape; and forming the internal surface to include a plurality of projecting portions, each projecting portion having an upper portion and a lower portion, each projecting portion being separated from adjacent projecting portions, each projecting portion having a radial flange disposed at, and integral with, the lower portion of the projecting portion, each of the radial flanges being disposed approximately perpendicular to the lower portions of the projecting portions.

2. The method of claim 1, wherein the maximum diametric difference along the internal surface creating the tubular structure is in the range from about 0.002 inch to about 0.020 inch.

3. The method of claim 1, wherein the bearing assembly is to be retained by a predetermined retention force, the method further comprising the steps of:

ascertaining the predetermined retention force; and choosing the pre-angle to provide the retention force.

4. The method of claim 3, further including the step of:

choosing the geometry of said scallops to provide said retention force.

5. The method of claim 1, wherein the bearing assembly is to be retained by a predetermined retention force, the method further comprising the steps of:

ascertaining the predetermined retention force; and choosing the geometry of the scallops to provide the retention force.

6. The method of claim 1, wherein the bearing assembly includes a predetermined number of bearing elements, the method further comprising the step of:

choosing the number of the scallops to be approximately the number of the predetermined number of bearing elements.

* * * * *